United States Patent
Wozniak et al.

(10) Patent No.: US 6,883,497 B2
(45) Date of Patent: Apr. 26, 2005

(54) METHOD OF PREVENTING PREIGNITION FOR AN INTERNAL COMBUSTION ENGINE

(75) Inventors: Ronald M. Wozniak, Auburn Hills, MI (US); John S. Jackson, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/664,323

(22) Filed: Sep. 17, 2003

(65) Prior Publication Data
US 2005/0056254 A1 Mar. 17, 2005

(51) Int. Cl.$^7$ .................................................. F02P 5/00
(52) U.S. Cl. ................................................. 123/406.26
(58) Field of Search ....................... 123/406.26–406.29, 123/406.33, 406.34, 406.37, 406.38, 406.39, 406.41

(56) References Cited

U.S. PATENT DOCUMENTS

| | | | | |
|---|---|---|---|---|
| 4,716,873 A | * | 1/1988 | Takaba et al. ......... | 123/406.34 |
| 4,846,129 A | * | 7/1989 | Noble .................... | 123/406.14 |
| 5,305,662 A | * | 4/1994 | Togai et al. ............ | 477/43 |
| 5,751,147 A | * | 5/1998 | Nakata et al. .......... | 324/399 |
| 5,842,456 A | * | 12/1998 | Morganti ................ | 123/606 |
| 5,870,688 A | * | 2/1999 | Kanbara et al. ........ | 701/110 |
| 6,006,155 A | * | 12/1999 | Wu et al. ............... | 701/111 |
| 6,298,823 B1 | * | 10/2001 | Takahashi et al. ..... | 123/406.37 |
| 6,354,268 B1 | * | 3/2002 | Beck et al. ............. | 123/435 |
| 6,560,526 B1 | * | 5/2003 | Matekunas et al. .... | 701/104 |
| 6,722,343 B1 | * | 4/2004 | Uchida et al. .......... | 123/406.33 |

FOREIGN PATENT DOCUMENTS

JP 13520 * 1/1999 .......... F02D/41/22

* cited by examiner

Primary Examiner—Hai Huynh
(74) Attorney, Agent, or Firm—Christopher DeVries

(57) ABSTRACT

Preignition in an engine is prevented by identifying engine conditions that relate to autoignition. If one or more of the engine conditions exceed a threshold, a controller retards the spark in the engine. The controller detects whether autoignition occurs in the engine due to the retarded spark advance. If autoignition is detected, the controller corrects the one or more engine conditions by at least one of reducing a throttle opening, cutting of fuel to a cylinder, adjusting a camshaft phase, and storing a diagnostic code.

23 Claims, 2 Drawing Sheets

METHOD OF PREVENTING PREIGNITION FOR AN INTERNAL COMBUSTION ENGINE

FIELD OF THE INVENTION

The present invention relates to electronic engine management, and more particularly to preventing preignition with electronic engine management.

BACKGROUND OF THE INVENTION

A typical vehicle engine relies on internal combustion within engine cylinders to provide torque. A spark generated by a spark plug ignites a mixture of air and fuel within the cylinders to cause combustion. Spark timing and control of the air/fuel mixture determine the performance of the engine.

Autoignition may cause damage to the cylinders, pistons, and valves. Autoignition occurs when the air/fuel mixture combusts without spark. Ideally, the spark ignites the air/fuel mixture slightly before the piston reaches top dead center (TDC). However, when a combustion chamber or spark plug surface in a cylinder reach a sufficiently high temperature, auto ignition occurs. Preignition refers to autoignition that occurs before proper spark timing.

Causes of preignition include, but are not limited to, low coolant, coolant system deposits, combustion chamber deposits, improper sparkplug heat range, and spark plug electrode wear and failure. Additionally, the use of low octane fuel, lower than the control capability of the knock control system within the engine management system, may cause preignition. Poor fuel flow resulting in a lean air/fuel ratio may also lead to preignition.

An ion sensing system may detect preignition. The ion sensing system applies current to a sparkplug gap. If ions are present in the gap, a measurement of the current may provide an indication of conditions within the combustion chamber. Combustion efficiency and ignition faults may be derived from the current measurement.

SUMMARY OF THE INVENTION

A method for preventing preignition in an engine includes identifying at least one engine condition that relates to autoignition. The spark is retarded in the engine for a single cycle if the engine condition exceeds a threshold. It is then detected whether autoignition occurs in the engine during the retarded spark advance. The autoignition is eliminated by at least one of the following: Reducing a throttle opening, cutting off fuel to a cylinder, adjusting a camshaft phase, and storing a diagnostic code.

Another feature of the invention includes detecting autoignition by determining whether a cylinder misfire occurs in the engine due to retarding spark. If no cylinder misfire is detected, autoignition is diagnosed. Diagnosing autoignition further includes calculating a ratio of autoignition occurrences per number of engine cycles. The ratio is compared to a threshold. If the ratio exceeds the threshold, autoignition is diagnosed.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses.

Figure 1:
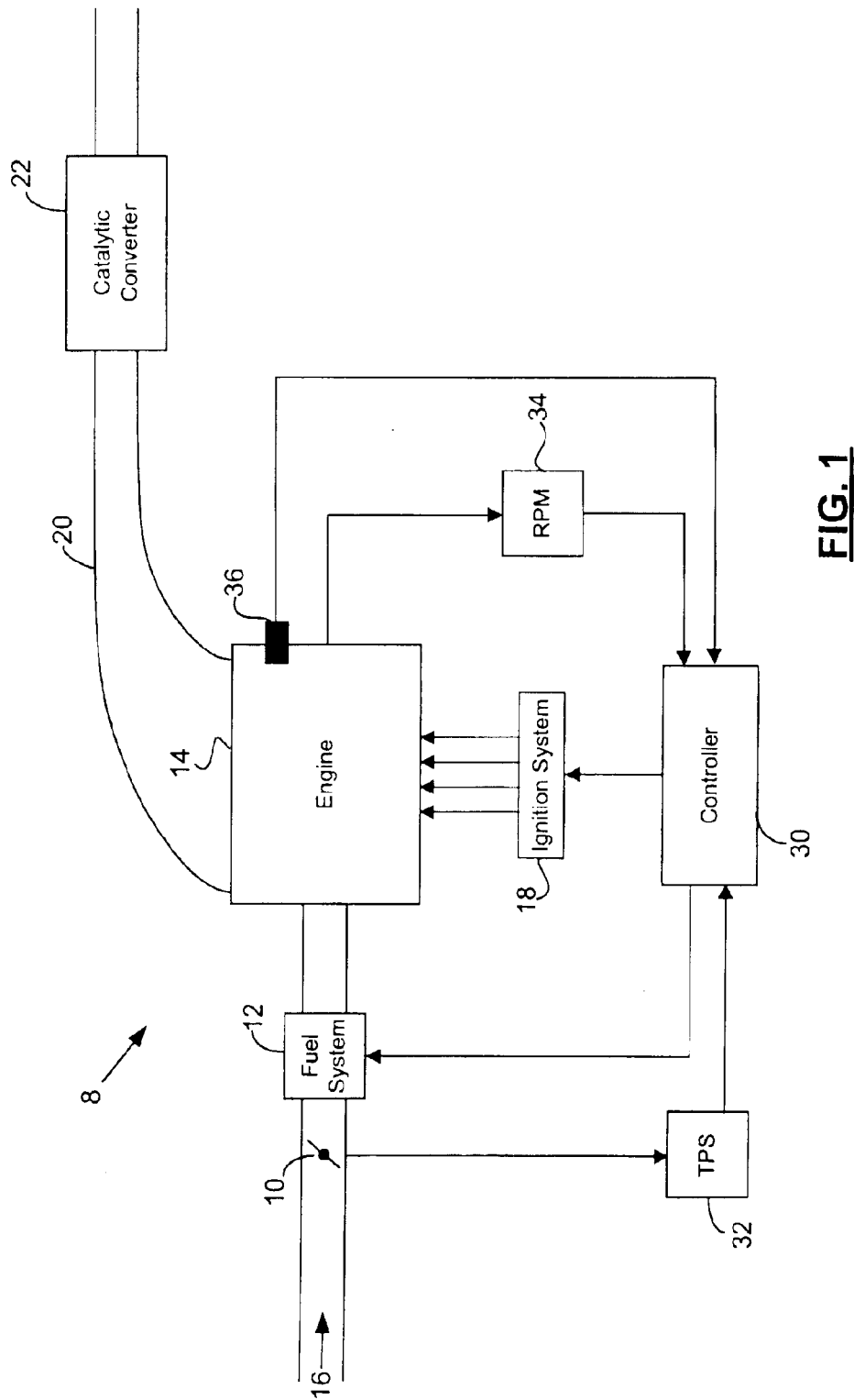
FIG. 1 is a block diagram of an engine control system.

Referring to FIG. 1, an exemplary engine control system 8 is shown. A throttle 10 and a fuel system 12 determine the air and fuel delivered to an engine 14 through an intake 16. An ignition system 18 ignites the air/fuel mixture in the engine 14. Exhaust gas created by the ignition of the air/fuel mixture is expelled through an exhaust manifold 20. A catalytic converter 22 receives the exhaust gas and reduces the emissions levels of the exhaust gas.

A controller 30 communicates with various components of the engine control system 8, including but not limited to a throttle position sensor 32 (TPS), the fuel system 12, the ignition system 18, and an engine speed sensor 34 (RPM). The controller 30 receives a throttle position signal from the TPS 32 and uses the information to determine airflow into the engine 14. The airflow data is then used to calculate fuel delivery from the fuel system 12 to the engine 14. The controller 30 further communicates with the ignition system 18 to determine ignition spark timing.

The controller 30 may receive additional feedback from other components in the engine control system 8, including but not limited to coolant temperature from a coolant temperature sensor 36 and engine speed from the engine speed sensor 34. These and other variables may affect the overall performance and behavior of the engine control system 8. The controller 30 utilizes data gathered from the various engine components to monitor and, in some cases, optimize engine performance.

In the present invention, the controller 30 communicates with components such as the TPS 32, the engine speed sensor 34, the fuel system 12, and/or the ignition system 18. If the controller 30 determines that conditions-such as engine speed, coolant temperature, and/or throttle position-are such that autoignition is likely, the controller 30 initiates a preignition prevention method according to the present invention to prevent autoignition.

Figure 2:
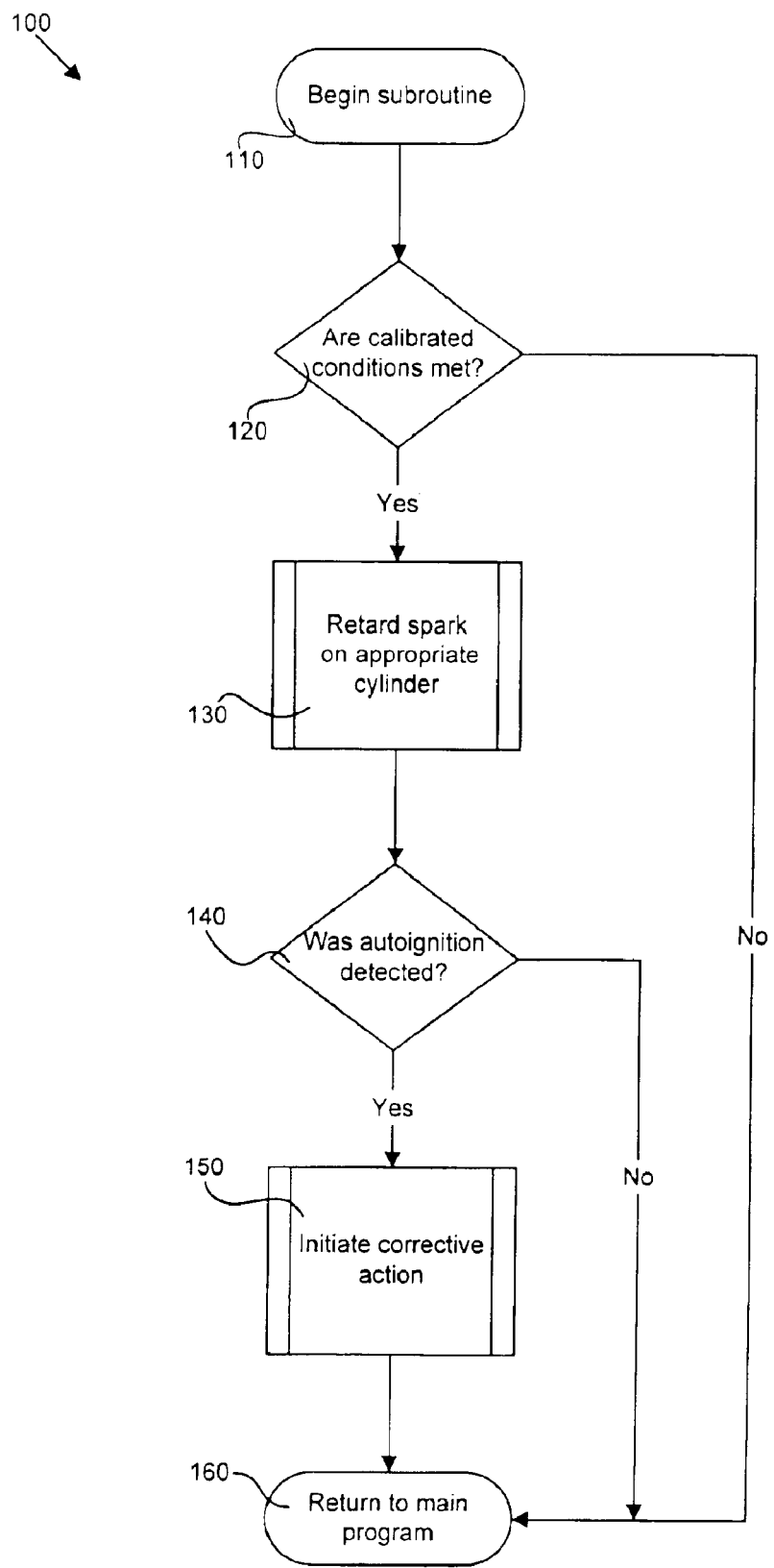
FIG. 2 is a flow diagram illustrating steps of a method for preventing preignition.

Referring to FIG. 2, a preignition prevention method 100 for an electronic engine controller is shown. The preignition prevention method 100 attempts to detect autoignition and prevent subsequent autoignition before engine cylinder temperatures increase enough to cause preignition. The engine controller begins the preignition prevention method at step 110. One or more engine conditions must be met for autoignition to occur. These engine conditions typically exist under high engine loads and make autoignition events more likely.

The engine conditions, which are calibratable, are determined at step 120. For example in step 120, control determines whether engine coolant is above a certain temperature. Other engine conditions affecting autoignition include, but are not limited to, engine speed, throttle position, air/fuel ratio, manifold pressure, cylinder airflow, and/or knock. The controller 30 may require that the conditions be met for a particular time period before proceeding with the subroutine 100. Additionally, all conditions do not necessarily have to be met. In one embodiment, all conditions must be met for the specified time period. In an alternative embodiment, only certain conditions must be met. For example, the controller 30 may assign a different weight to each condition and calculate an overall likelihood of autoignition from collected data. The controller 30 may also require M out of N conditions to be met. Still other variations will be apparent to those skilled in the art.

If the likelihood of autoignition conditions are not met, the preignition prevention method 100 terminates at step 160. If the particular autoignition conditions are met, however, the sub-routine 100 proceeds to step 130 where the controller 30 retards spark. The amount of spark retard is calibrated to assist autoignition detection. The spark retard should be sufficient to reduce torque enough to be considered a cylinder misfire. Typically, the spark retard value is larger than a typical knock control system. A typical knock control system retards spark a minimal amount, such as five degrees, to decrease the probability of continued knock and to minimize torque reduction. However, spark retard should not be calibrated too high, which may cause significant combustion in the exhaust system. Combustion in the exhaust system may lead to damage and other performance issues. An example of a spark retard for the present invention is twenty degrees. Testing may be performed to determine the optimal spark retard calibration. For example, a spark angle between zero and ten degrees after top dead center (ATDC) for a fraction of total cylinder cycles at the high load condition may be adequate for most engines to test for autoignition.

The controller 30 determines if autoignition was detected after spark retard for the corresponding cylinder in step 140. The controller 30 checks for a misfire during the cylinder's cycle. Misfire may be detected by RPM variation analysis techniques. Alternatively, misfire may be detected by ion sense methods, cylinder pressure sensing, or any other suitable method. If a misfire is not detected, the controller 30 may assume that autoignition occurred sufficiently before TDC so that torque was not reduced significantly as compared to torque variance associated with a steady state spark advance. The absence of a misfire indicates that the intra-cylinder environment has sufficient energy to cause preignition. A filter may be used to increase confidence in this determination. The filter may calculate a ratio of autoignition counts per cycle and compare the calculation to a calibratable threshold. It the threshold is met or exceeded, autoignition is detected and the sub-routine 100 proceeds to step 150. Otherwise, the preignition prevention method 100 terminates at step 160.

Alternatively, the controller 30 may detect autoignition in step 140 by monitoring ion current through a spark gap. This ion current is monitored when the spark is removed due to the spark retard. Variances in ion current under these conditions may indicate the likelihood of autoignition and preignition.

In step 160, the controller 30 may take corrective or preventative measures to remedy autoignition conditions. Specifically, the controller 30 may take measures to remedy any engine conditions diagnosed in step 120. These measures may include, but are not limited to, reducing throttle opening, cutting off fuel, and adjusting camshaft phase. Additionally, the controller 30 may store a diagnostic code in controller memory, warn a vehicle driver, and/or activate an autoignition indicator.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method for preventing preignition in a spark ignition engine comprising:

identifying at least one engine condition that relates to autoignition in the engine;

retarding spark in the engine if the engine condition exceeds a threshold;

detecting whether autoignition occurs in the engine due to the retarded spark advance; and correcting the engine condition by at least one of reducing a throttle opening, cutting off fuel to a cylinder, adjusting a camshaft phase, and storing a diagnostic code if autoignition is detected.

2. The method of claim 1 wherein the at least one engine condition is at least one of coolant temperature, throttle position, air/fuel ratio, manifold pressure, and cylinder air flow.

3. The method of claim 1 wherein the step of retarding spark is performed if the engine condition exceeds the threshold for a first period.

4. The method of claim 1 wherein the step of detecting autoignition includes defecting whether a cylinder misfire occurs in the engine.

5. The method of claim 4 wherein the step of detecting the cylinder misfire is performed using RPM variation analysis.

6. The method of claim 4 wherein the stop of detecting the cylinder misfire is performed using ion sensing.

7. The method of claim 4 wherein the step of detecting the cylinder misfire is performed using cylinder pressure sensing.

8. The method of claim 4 further comprising diagnosing autoignition if a cylinder misfire is not detected.

9. The method of claim 8 wherein diagnosing autoignition includes:

calculating a ratio of autoignition occurrences;

comparing the ratio to a second threshold; and diagnosing autoignition if the ratio exceeds the second threshold.

10. The method of claim 1 wherein detecting autoignition includes applying an ion current through a spark gap and monitoring the ion current after the spark retard.

11. A method for preventing preignition in a spark ignition engine comprising:

identifying a plurality of engine conditions that relates to autoignition in the engine;

retarding spark in the engine if the plurality of engine conditions exceeds corresponding thresholds;

detecting whether autoignition occurs in the engine due to the retarded spark advance; and correcting the plurality of engine conditions by at least one of reducing a throttle opening, cutting off fuel to a cylinder, adjusting a camshaft phase, and storing a diagnostic code if autoignition is detected.

12. The method of claim 11 wherein the plurality of engine conditions includes at least one of coolant temperature, throttle position, air/fuel ratio, manifold pressure, and cylinder air flow.

13. The method of claim 12 wherein the step of retarding spark is performed if the plurality of engine conditions exceeds the thresholds for a first period.

14. An engine preignition prevention system comprising:

at least one sensor that identifies at least one engine condition that relates to autoignition;

a controller that retards spark in the engine if at least one engine condition exceeds a threshold and that detects whether autoignition occurs in the engine due to the retarded spark advance; and wherein the controller communicates with the at least one sensor corrects the engine condition by at least one of reducing a throttle opening, cutting off fuel to a cylinder, adjusting a camshaft phase, and storing a diagnostic code if autoignition is detected.

15. The engine preignition prevention system of claim 14 wherein the at least one engine condition is at least one of coolant temperature, throttle position, air/fuel ratio, manifold pressure, and cylinder air flow.

16. The engine preignition prevention system of claim 14 wherein the controller retards spark in the engine if the engine condition exceeds a threshold for a period.

17. The engine preignition prevention system of claim 14 wherein the controller detects autoignition by detecting whether a cylinder misfire occurs in the engine.

18. The engine preignition prevention system of claim 17 wherein the controller detects whether a cylinder misfire occurs using RPM variation analysis.

19. The engine preignition prevention system of claim 17 wherein the controller detects whether a cylinder misfire occurs using ion sensing.

20. The engine preignition prevention system of claim 17 wherein the controller detects whether a cylinder misfire occurs using cylinder pressure sensing.

21. The engine preignition prevention system of claim 17 wherein the controller diagnoses an autoignition condition if a cylinder misfire is not detected.

22. The engine preignition prevention system of claim 21 wherein the controller diagnoses an autoignition condition by:

calculating a ratio of autoignition occurrences per number of engine cylinder cycles;

comparing the ratio to a second threshold; and diagnosing the autoignition condition if the ratio exceeds the second threshold.

23. The engine preignition prevention system of claim 14 wherein the controller detects autoignition by applying an ion current through a spark gap and monitoring the ion current after the spark retard.

* * * * *